(12) United States Patent
Morita

(10) Patent No.: US 9,930,192 B2
(45) Date of Patent: Mar. 27, 2018

(54) IMAGE PROCESSING APPARATUS, IMAGE PROCESSING SYSTEM, CONTROL METHOD OF IMAGE PROCESSING APPARATUS, AND STORAGE MEDIUM

(71) Applicant: CANON KABUSHIKI KAISHA, Tokyo (JP)

(72) Inventor: Hiroyasu Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/087,763

(22) Filed: Mar. 31, 2016

(65) Prior Publication Data

US 2016/0219158 A1    Jul. 28, 2016

Related U.S. Application Data

(63) Continuation of application No. 13/896,669, filed on May 17, 2013, now Pat. No. 9,332,136.

(30) Foreign Application Priority Data

May 21, 2012   (JP) ................................ 2012-115755

(51) Int. Cl.
*G06F 3/12* (2006.01)
*H04N 1/00* (2006.01)
*H04L 29/06* (2006.01)
*H04L 29/08* (2006.01)
*H04L 12/58* (2006.01)
*H04N 1/32* (2006.01)
*G06F 15/00* (2006.01)

(52) U.S. Cl.
CPC ....... *H04N 1/00095* (2013.01); *H04L 51/066* (2013.01); *H04L 67/06* (2013.01); *H04L 69/18* (2013.01); *H04N 1/00114* (2013.01); *H04N 1/00204* (2013.01); *H04N 1/00212* (2013.01); *H04N 1/00244* (2013.01); *H04N 1/00411* (2013.01); *H04N 1/32117* (2013.01); *H04L 63/101* (2013.01); *H04L 67/12* (2013.01); *H04N 2201/0094* (2013.01)

(58) Field of Classification Search
CPC ........... H04N 1/00206; H04N 1/00214; H04N 1/32048; H04N 1/0022; H04N 2201/0093
USPC ........ 358/1.1, 1.4, 1.5, 1.9, 1.11, 1.12, 1.13, 358/1.14, 1.15, 1.16, 1.17, 1.18
See application file for complete search history.

(56) References Cited

U.S. PATENT DOCUMENTS 9,332,136 B2 * 5/2016 Morita ............... H04N 1/00095
2011/0271324 A1 * 11/2011 Ikeda ................... H04L 67/306
726/3

FOREIGN PATENT DOCUMENTS

| JP | 2011015001 A | 1/2011 |
| JP | 2011234169 A | 11/2011 |
| JP | 2012034178 A | 2/2012 |

* cited by examiner

*Primary Examiner* — Thierry L Pham
(74) *Attorney, Agent, or Firm* — Canon U.S.A., Inc. IP Division

(57) ABSTRACT

An image processing apparatus and method includes inputting user information, setting folder information about a specified user based on the user information as a destination of image data, registering the set folder information, and performing control so as not to register folder information corresponding to a transmission protocol set to be disable from among a plurality of transmission protocols.

16 Claims, 16 Drawing Sheets

FIG.4

| LOGIN | | |
|---|---|---|
| USER ID | user_a | ~401 |
| PASSWORD | xyz | ~402 |

FIG.6

| FOLDER REGISTRATION (user_a) | |
|---|---|
| ■ PROTOCOL | SMB ▼ — 601 |

■ FOLDER HOST NAME
server.abc.co.jp —602

■ FOLDER PATH
/home/tanaka —603

■ USER NAME
tanaka —604

■ PASSWORD
secret55 —605

FIG.9

| FUNCTION LIMITATION (user_a) | |
|---|---|
| FAX TRANSMISSION | PERMITTED |
| E-MAIL TRANSMISSION | PROHIBITED |
| SMB FILE TRANSMISSION | PERMITTED |
| FTP FILE TRANSMISSION | PROHIBITED |
| WebDAV FILE TRANSMISSION | PERMITTED |

FIG.10

| FOLDER REGISTRATION (user_a) | |
|---|---|
| ■ PROTOCOL | PROTOCOL ▼ ~601 |
| | SMB ▼ |
| | FTP ▼ |
| | WebDAV ▼ |

■ FOLDER HOST NAME
server.abc.co.jp ~602

■ FOLDER PATH
/home/tanaka ~603

■ USER NAME
tanaka ~604

■ PASSWORD
secret55 ~605

FIG.11A

| SHARED ADDRESS BOOK | | |
|---|---|---|
| TYPE /1101 | NAME /1102 | ADDRESS /1103 |
| FAX | Tanaka | 03-1111-1111 |
| FTP | Ito | Server1.abc.com |
| WebDAV | Kato | Server2.abc.com |
| E-MAIL | Kimura | kimura@abc.com |
| FTP | Ikeda | Server3.abc.com |
| E-MAIL | Maeda | maeda@abc.com |

/1104 PERSONAL   /1105 REGISTER   /1106 DISPLAY DETAIL   /1107 DETERMINE

FIG.11B

| PERSONAL ADDRESS BOOK (user_a) | | |
|---|---|---|
| TYPE /1111 | NAME /1112 | ADDRESS /1113 |
| FAX | Suzuki | 03-2222-2222 |
| SMB | Sato | Server4.abc.com |
| WebDAV | Yamada | Server5.abc.com |

/1114 SHARED   /1115 REGISTER   /1116 DISPLAY DETAIL   /1117 DETERMINE

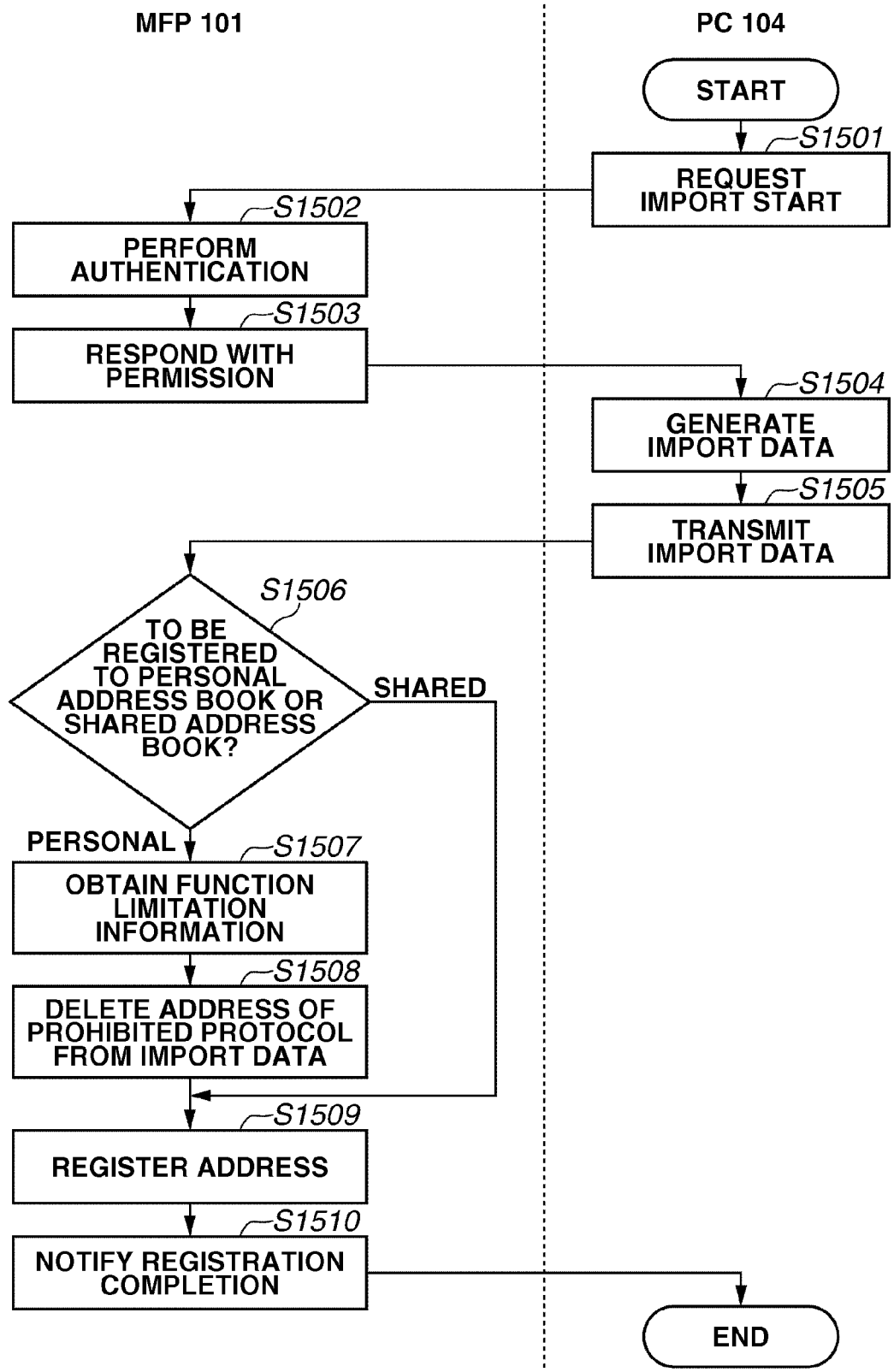

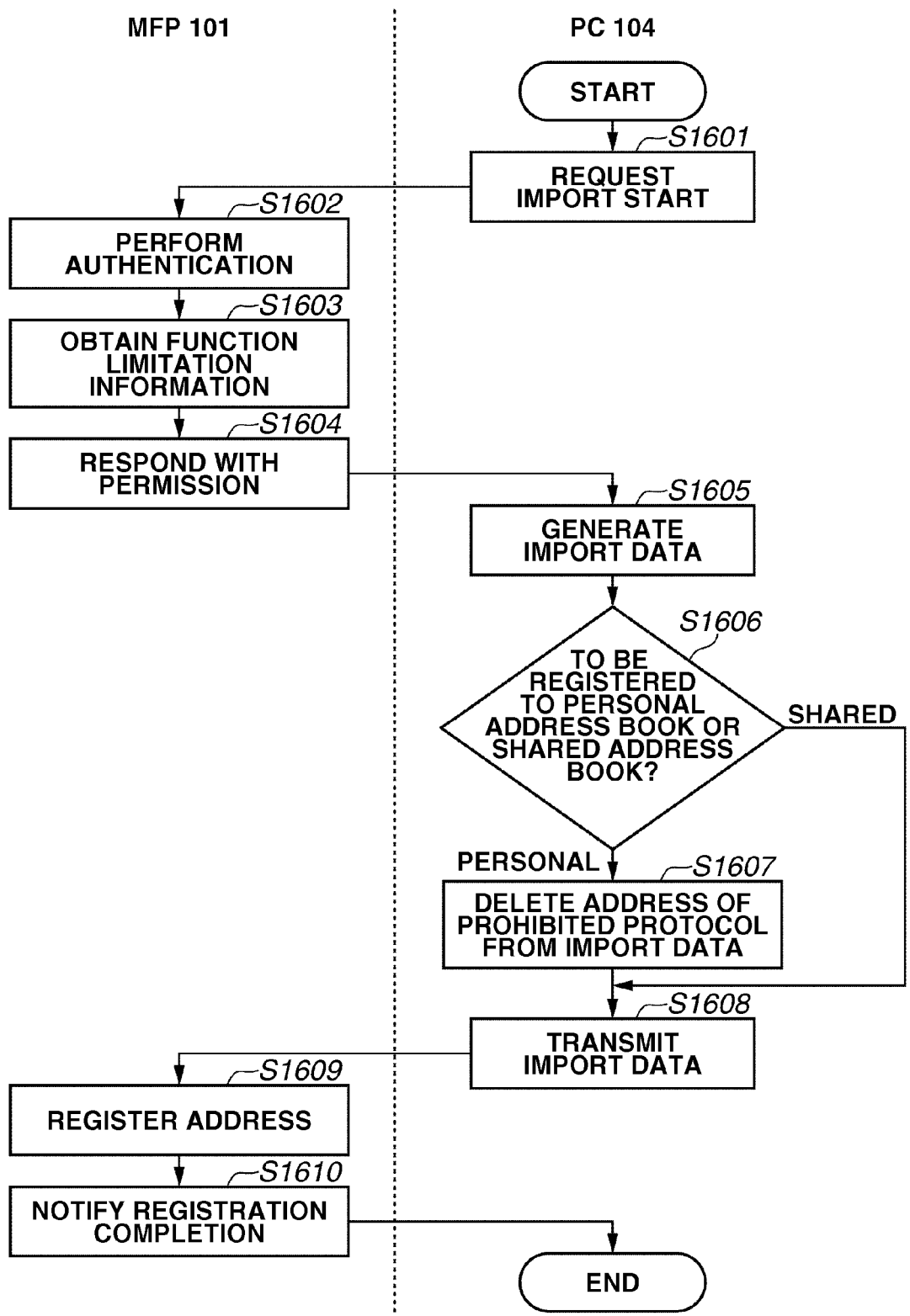

IMAGE PROCESSING APPARATUS, IMAGE PROCESSING SYSTEM, CONTROL METHOD OF IMAGE PROCESSING APPARATUS, AND STORAGE MEDIUM

CROSS-REFERENCE TO RELATED APPLICATIONS

This application is a Continuation of U.S. application Ser. No. 13/896,669, presently pending and filed May 17, 2013, which claims priority from Japanese Patent Application No. 2012-115755 filed May 21, 2012, which are hereby incorporated by reference herein in their entireties.

BACKGROUND

Field

Aspects of the present invention generally relate to an image processing apparatus capable of registering a destination of image data, an image processing system, a control method of the image processing apparatus, and a storage medium.

Description of the Related Art

Conventionally, an image processing apparatus which can transmit image data using transmission protocols for facsimile, electronic mail (E-mail), and various types of file transmissions is known. As a protocol used for file transmission, for example, a server message block (SMB) and a file transfer protocol (FTP) are known. Further, Web-based distributed authoring and versioning protocol (WebDAV) for the World Wide Web (WWW) is also known as another protocol used for the file transmission. A destination corresponding to each transmission protocol can be registered to a destination book, and thus a user can save time for manually inputting the destination for each transmission.

In addition, it is conventionally known that use of a specific transmission protocol included in a plurality of transmission protocols may be set to be disabled for security purpose (for example, prevention of confidential information leakage). If the specific transmission protocol is set to be disabled and the destination corresponding to the specific transmission protocol is selected from the destinations registered in the destination book to transmit image data, a transmission error occurs. In this case, a user needs to select again the destination corresponding to another transmission protocol that is not set to be disabled, which is a time-consuming task.

Japanese Patent Application Laid-Open No. 2011-234169 discusses a technique that can prevent a user from selecting an incorrect destination in advance by not displaying a destination corresponding to a transmission protocol set to be disabled in destinations registered to a destination book.

The technique discussed in Japanese Patent Application Laid-Open No. 2011-234169 is intended to not display the destination corresponding to the transmission protocol set to be disabled in the destinations registered to the destination book, and the destination itself that cannot be used is registered to the destination book. In other words, when the destination is registered to the destination book, it is difficult for the user to know that the image data cannot be transmitted using the destination, and the user does not know that fact until the destination is actually used. From another point of view, when the limited number of destinations can be registered to the destination book, registration of destinations that cannot be used may hinder registration of necessary destinations to the destination book.

Such an issue is not limited to the destination book. For example, in recent years, an image processing apparatus provided with an operation key of "transmit file to yourself" has been known. In such an image processing apparatus, according to an operation of the operation key of "transmit file to yourself", folder information about a user currently operating the image processing apparatus is automatically set as a destination of image data. Accordingly, the user can transmit (store) the image data in the user's own folder with a simple operation.

The folder information set by "transmit file to yourself" can be previously registered in association with each user. However, if the folder information corresponding to the transmission protocol set to be disabled is registered, the user cannot notice that the image data cannot be transmitted until the image data is to be actually transmitted after the destination is set using the operation key of "transmit file to yourself".

SUMMARY

Aspects of the present invention generally relate to a system capable of preventing a destination corresponding to a transmission protocol set to be disabled from registering.

One aspect of the present invention provides an image processing apparatus includes a reception unit configured to receive input of user information, an operation key configured to set folder information about a specified user based on the user information as a destination of image data, a registration unit configured to register the folder information set according to an operation of the operation key, and a control unit configured to perform control so as not to register, by the registration unit, folder information corresponding to a transmission protocol set to be disabled from among a plurality of transmission protocols.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an operation screen of the MFP according to the exemplary embodiment.

FIG. 6 illustrates an operation screen of the MFP according to the exemplary embodiment.

FIG. 9 illustrates an operation screen of the MFP according to the exemplary embodiment.

FIG. 10 illustrates an operation screen of the MFP according to the exemplary embodiment.

FIGS. 11A and 11B illustrate operation screens of the MFP according to the exemplary embodiment.

FIG. 15 is a flowchart illustrating a destination-book registration operation performed by the MFP and a PC according to the exemplary embodiment.

FIG. 16 is a flowchart illustrating a destination-book registration operation performed by the MFP and the PC according to the exemplary embodiment.

DESCRIPTION OF THE EMBODIMENTS

Various exemplary embodiments, features, and aspects of the invention will be described in detail below with reference to the drawings.

Figure 1:
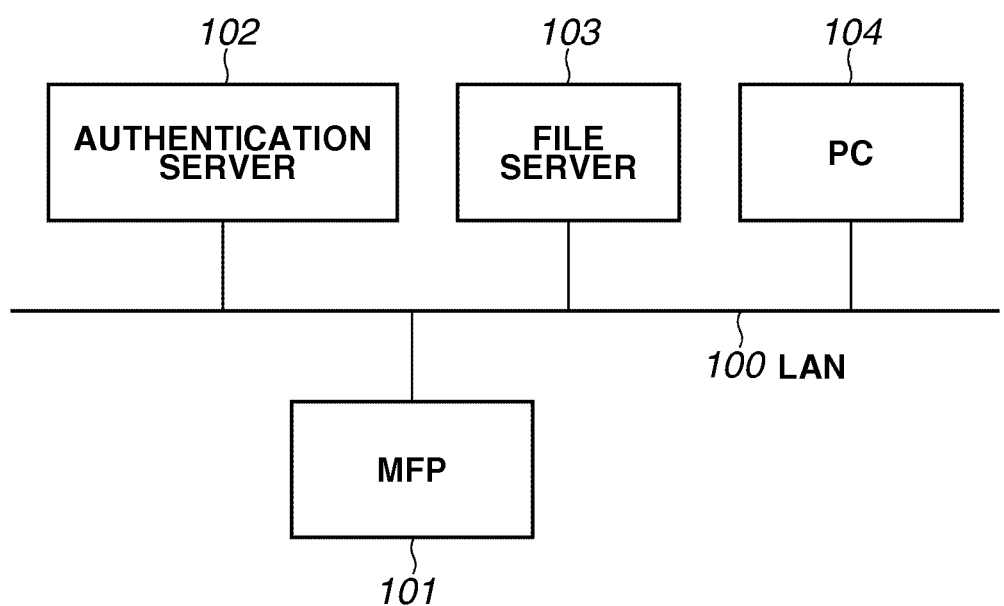
FIG. 1 illustrates an entire image processing system according to an exemplary embodiment.

A first exemplary embodiment will now be described. FIG. 1 illustrates an entire image processing system. An MFP 101, an authentication server 102, a file server 103, and a PC 104 are communicably connected with one another on a local area network (LAN) 100. The MFP 101 is an example of an image processing apparatus. According to the present exemplary embodiment, the MFP is described as an example of the image processing apparatus. However, the MFP is not necessarily adopted and a scanner device having a single function may be used as the image processing apparatus, as long as it has a function of registering a destination of the image data.

The authentication server 102 is an example of an authentication device. According to the present exemplary embodiment, an example where the authentication server 102 is separately provided from the MFP 101 is described. However, the authentication function of the authentication server 102 may be incorporated in the MFP 101. The file server 103 is an example of a file management device. The MFP 101 can set a folder in the file server 103 as a destination and transmit a file of the image data using SMB, FTP, or WebDAV. The PC 104 is an example of an external device. The MFP 101 can receive destination data (import data) from the PC 104 and register it to the destination book.

The MFP 101 can transmit and receive an E-mail to which the image data is attached via a mail server (not illustrated). The image processing system includes the MFP 101, the authentication server 102, the file server 103, and the PC 104. However, only a part (one or more) of them can be also referred to as the image processing system.

Figure 2:
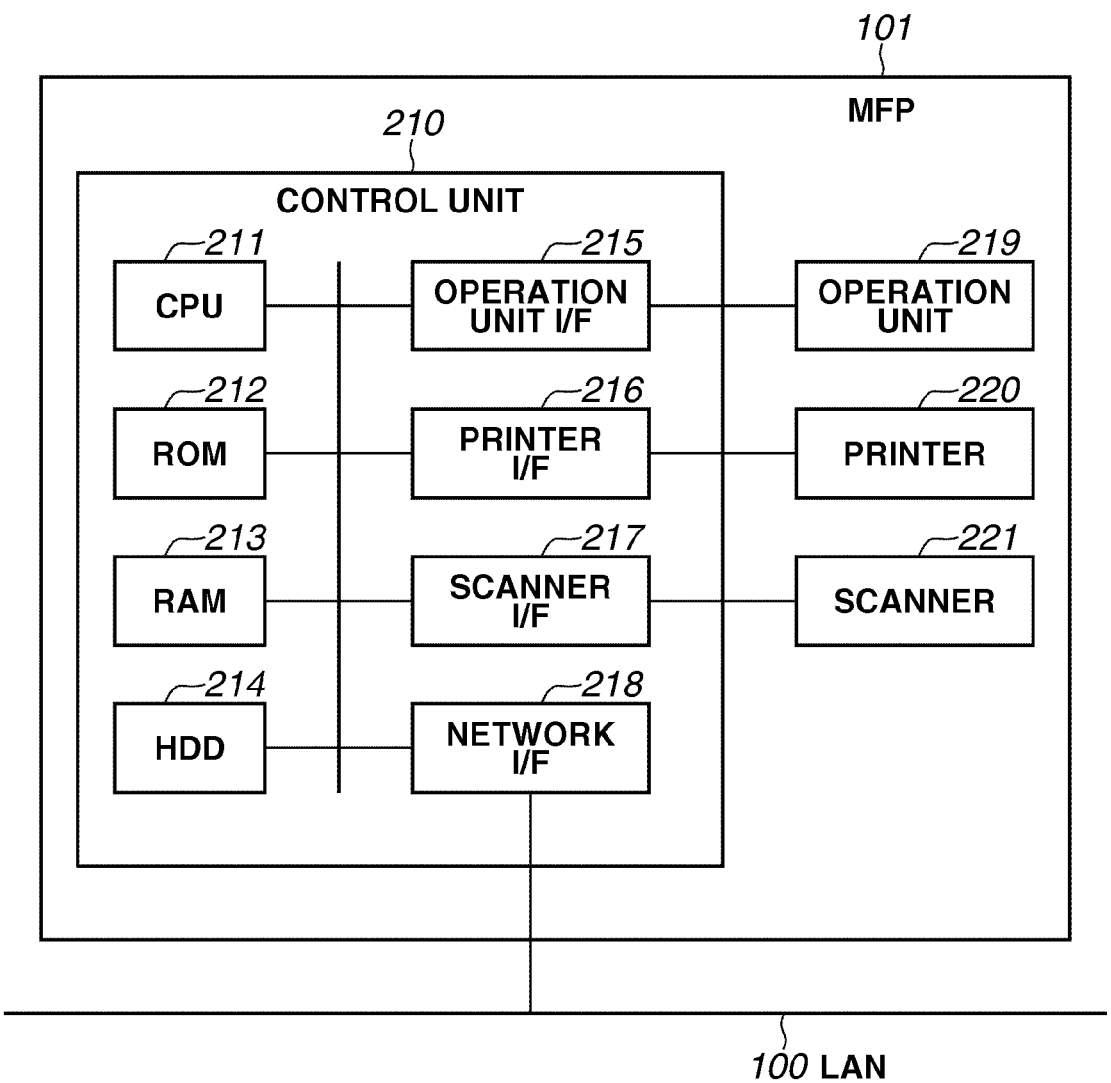
FIG. 2 is a block diagram illustrating a configuration of a multifunction peripheral (MFP) according to the exemplary embodiment.

FIG. 2 is a block diagram illustrating a configuration of the MFP 101. A control unit 210 including a central processing unit (CPU) 211 controls operations of the entire MFP 101. The CPU 211 reads a control program stored in a read only memory (ROM) 212 to perform various types of control including reading control and transmission control. A random access memory (RAM) 213 is used as a main memory and a temporary storage area such as a work area of the CPU 211. The MFP 101 performs each processing illustrated in a flowchart described below using one memory (the RAM 213 or a hard disk drive (HDD) 214) by one CPU 211, however, another embodiment may be adopted. For example, a plurality of CPUs and a plurality of RAMs or HDDs can cooperate with one another to perform each processing illustrated in the flowchart described below.

The HDD 214 stores image data and various types of programs. An operation interface (I/F) 215 connects an operation unit 219 with a control unit 210. The operation unit 219 includes a liquid crystal display unit having a touch-panel function, a keyboard, and the like which function as a reception unit for receiving a user's instruction.

A printer I/F 216 connects a printer 220 with the control unit 210. Image data to be printed by the printer 220 is transferred from the control unit 210 via the printer I/F 216 and printed onto a recording medium by the printer 220.

A scanner I/F 217 connects a scanner 221 with the control unit 210. The scanner 221 reads an image on a document to generate image data (an image file), and inputs the image data into the control unit 210 via the scanner I/F 217. The MFP 101 can transmit the file or the E-mail including the image data generated by the scanner 221.

A network I/F 218 connects the control unit 210 (MFP 101) with the LAN 100. The network I/F 218 transmits various types of information to external devices on the LAN 100 and also receives various types of information from the external devices thereon. The MFP 101 further includes a modem (not illustrated) to transmit and receive a facsimile via a telephone line.

Figure 3:
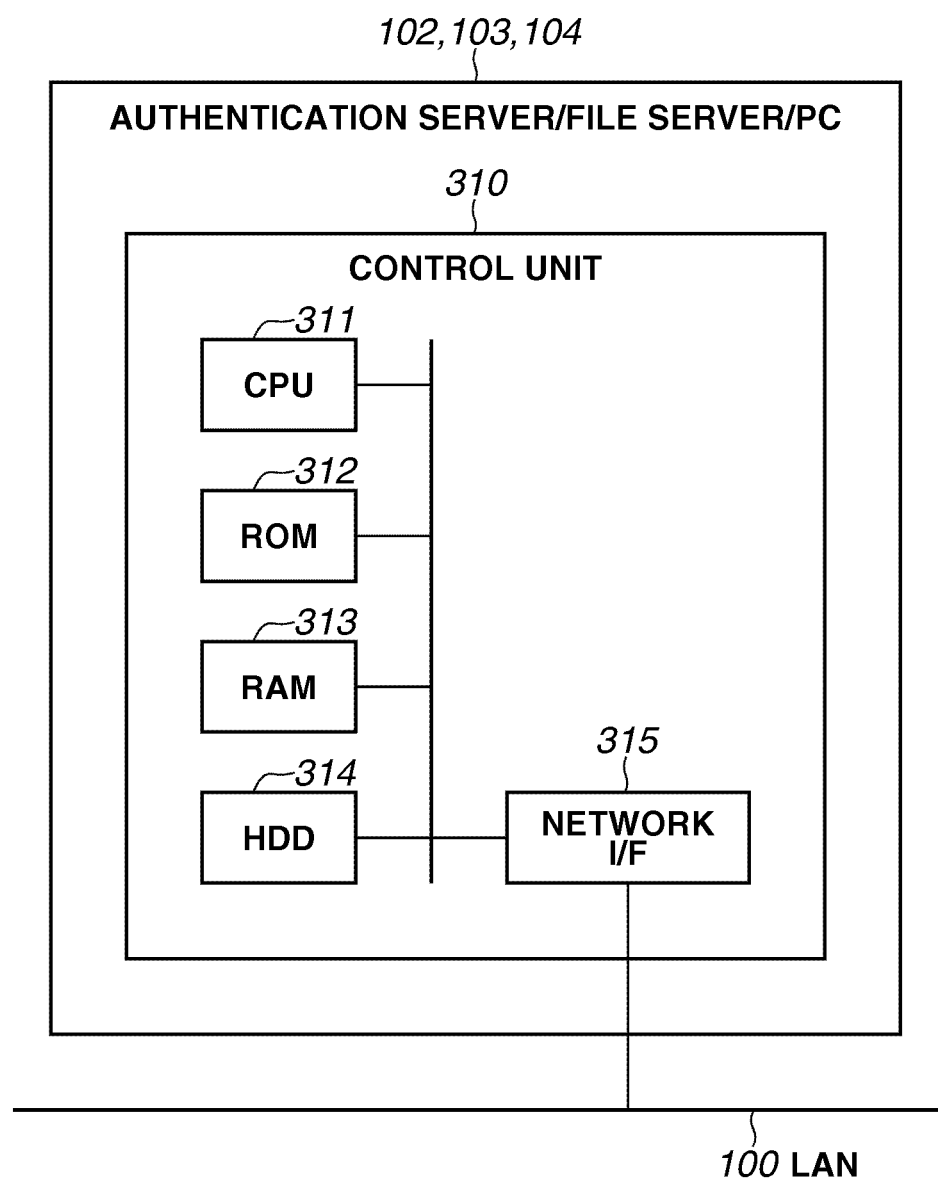
FIG. 3 is a block diagram illustrating a configuration of an authentication server, a file server, and a personal computer (PC) according to the exemplary embodiment.

FIG. 3 is a block diagram illustrating a configuration of the authentication server 102. A control unit 310 including a CPU 311 controls operations of the entire authentication server 102. The CPU 311 reads a control program stored in a ROM 312 to execute various types of control processing. A RAM 313 is used as a main memory and a temporary storage area such as a work area of the CPU 311. The authentication server 102 performs each processing illustrated in a flowchart described below using one memory (the RAM 313 or a HDD 314) by one CPU 311, however, another embodiment may be adopted. For example, a plurality of CPUs and a plurality of RAMs or HDDs can cooperate with one another to perform each processing illustrated in the flowchart described below.

The HDD 314 stores image data and various types of programs. The network I/F 315 connects the control unit 310 (authentication server 102) with the LAN 100. The network I/F 315 can transmit and receive various types of information to/from other devices on the LAN 100.

A configuration of the file server 103 is similar to that of the authentication server 102. The PC 104 includes the similar configuration to that of the authentication server 102, and further includes a keyboard and a display that function as a user interface.

Figure 4:
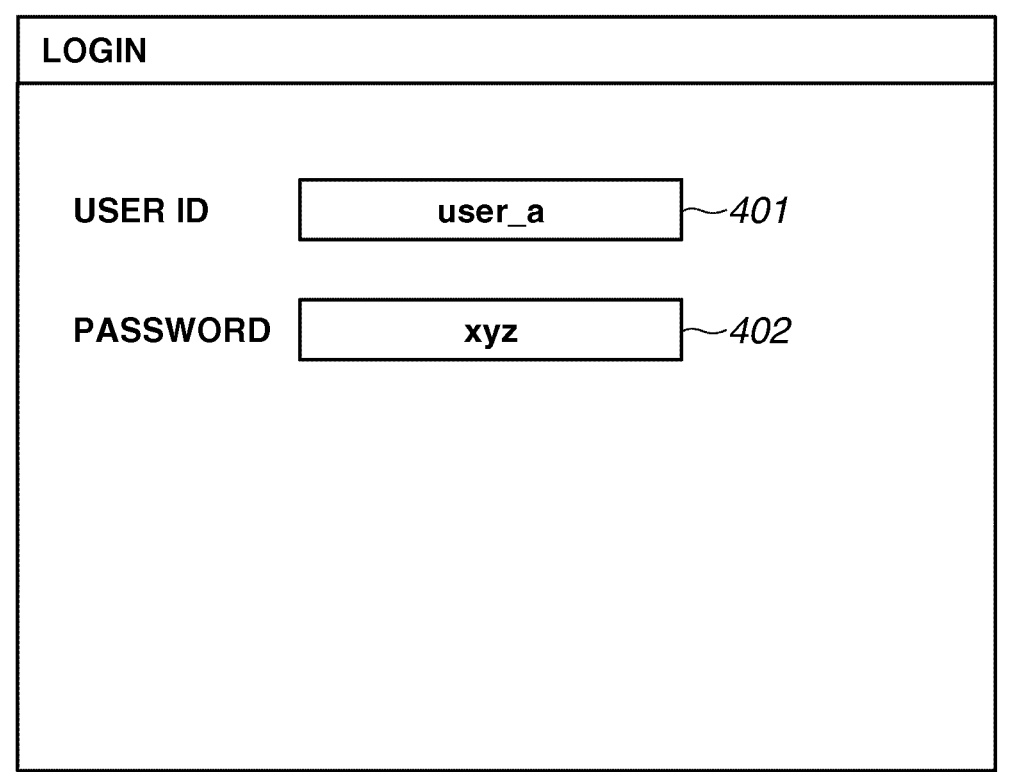

FIG. 4 illustrates an example of an operation screen displayed on the operation unit 219. When a user starts to use the MFP 101, the user is required to input user information (user identification (ID) and a password) via the screen illustrated in FIG. 4. A region 401 receives an input of the user ID. A region 402 receives an input of the password. The user information input in the screen is transmitted to the authentication server 102. The authentication server 102 specifies (authenticates) the user based on the received user information, and then responds to the MFP 101 with a result of the authentication. When it is notified that the user authentication is successfully performed, the MFP 101 permits the user to use the MFP 101.

Figure 5:
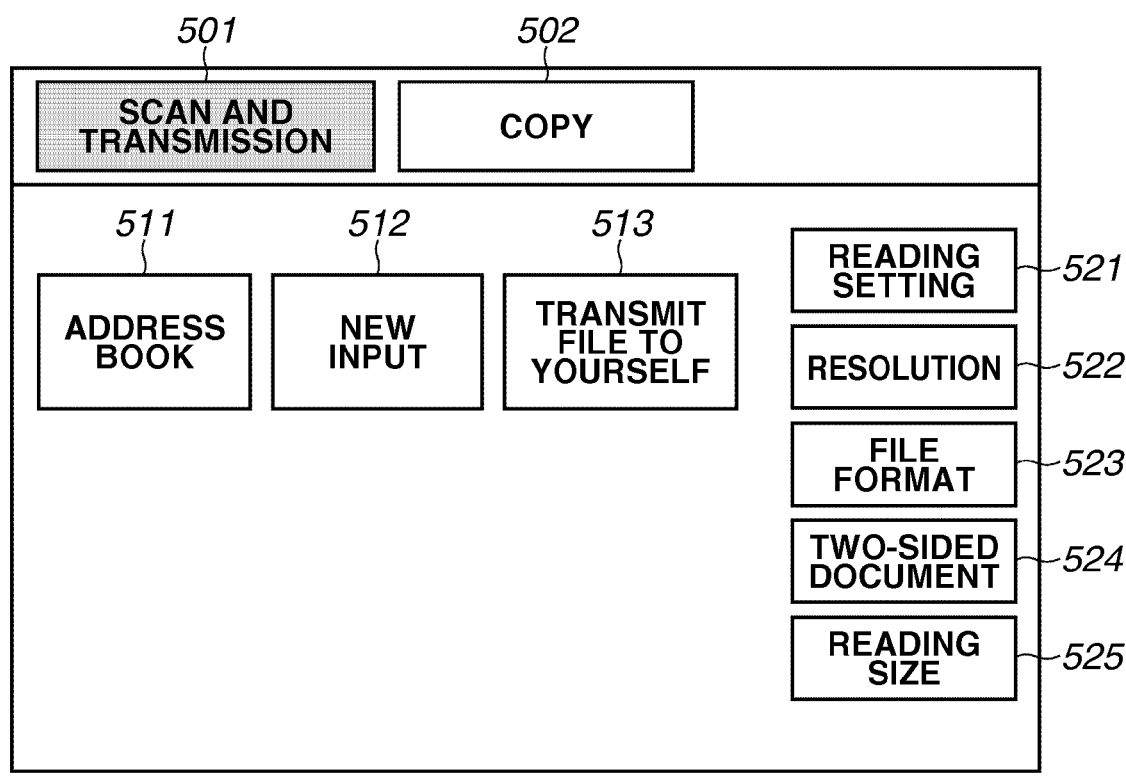
FIG. 5 illustrates an operation screen of the MFP according to the exemplary embodiment.

FIG. 5 illustrates an example of an operation screen displayed on the operation unit 219. The user operates an operation key 501 or 502 on the screen illustrated in FIG. 5 to select a function. FIG. 5 indicates a state where the operation key 501 is selected. As illustrated in FIG. 5, "scan and transmission" and "copy" are displayed as an example of functions, however, the MFP 101 may be provided with functions other than these two functions.

The user who has selected the operation key 501 operates any of operation keys 511 to 513 to set a destination of image data to be transmitted. Upon the operation of the operation key 511, contents of an destination book stored in the HDD 214 is displayed, thus the user can set the destination of the image data with reference to the contents registered to the destination book.

Upon the operation of the operation key 512, a screen for receiving a new input of a destination from the user is displayed. The user can input and set the new destination via the displayed screen as the destination of the image data. The operation key 513 is used for an operation when the user wants to set a user's own folder as the destination of the image data (when the user wants to transmit the file of the image data to the destination of the user's own folder). Upon the operation of the operation key 513 by the user, the user's own folder is automatically set as the destination of the image data.

An operation key 521 is used when a reading setting such as color/monochrome is performed. An operation key 522 is used when a reading resolution is set. An operation key 523 is used when a file format of the image data to be transmitted is set. An operation key 524 is used when one-sided/two-sided reading is set. An operation key 525 is used when a reading size is set.

FIG. 6 illustrates an example of an operation screen displayed on the operation unit 219. The user can previously register the destination (folder information) set according to the operation of the operation key 513 via the screen illustrated in FIG. 6.

A region 601 receives selection of a transmission protocol. In the region 601, SMB, FTP, and WebDAV may be displayed as a list of options in a drop-down format. However, the transmission protocol other than the above-described transmission protocols may be included as the option.

A region 602 receives a host name of a server (file server 103) for managing a folder to be the destination of the image data. A region 603 receives a path of the folder to be the destination of the image data. Regions 604 and 605 receive authentication information (user name and password) required for accessing the folder to be the destination of the image data.

The folder information registered via the screen in FIG. 6 is stored in the HDD 214. FIG. 6 illustrates an example of the screen when user's folder information of "user_a" is registered. However, a similar screen is displayed when another user registers own folder information. The HDD 214 stores each user's own folder information by associating with each of a plurality of users.

Figure 7:
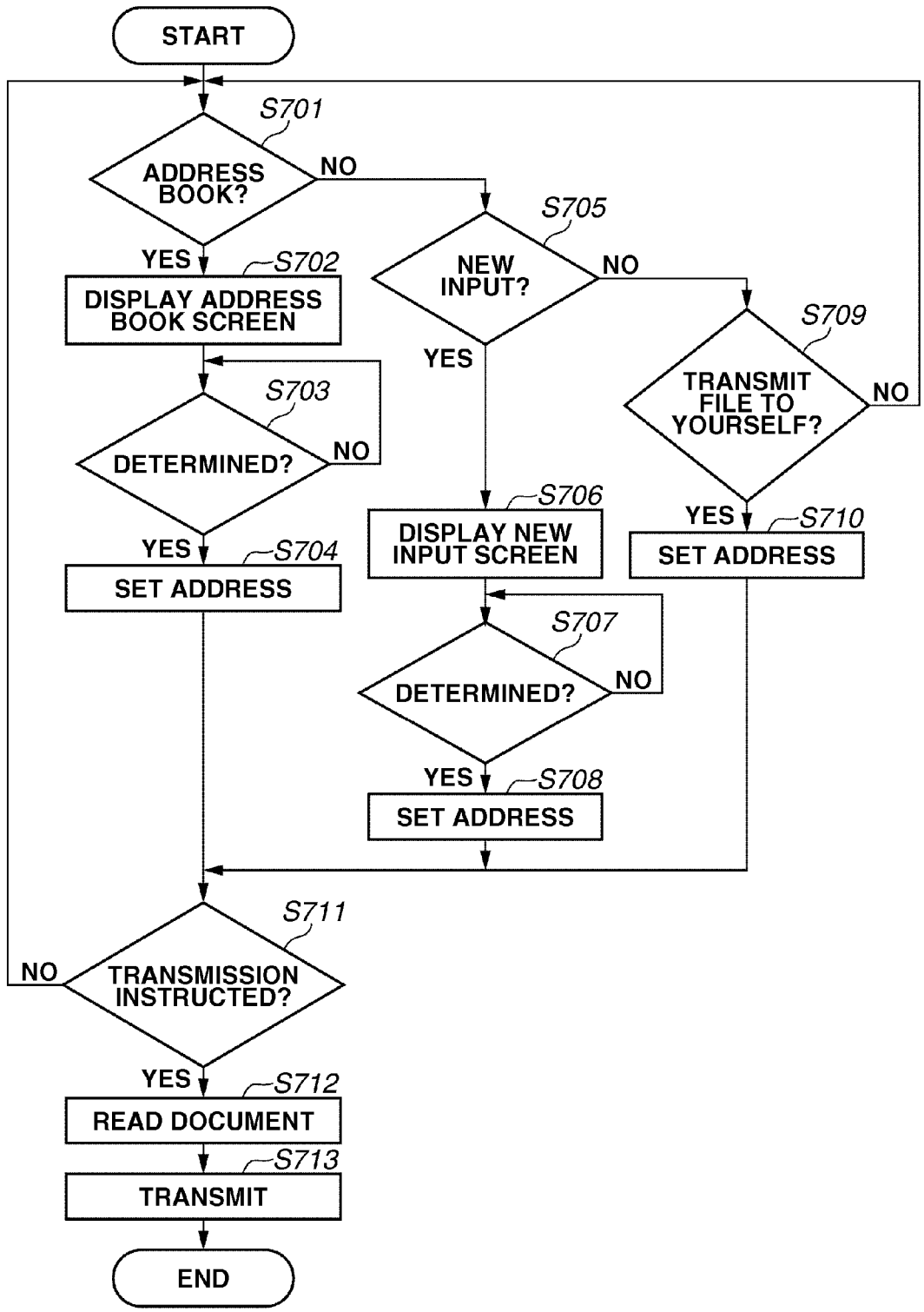
FIG. 7 is a flowchart illustrating a transmission operation performed by the MFP according to the exemplary embodiment.

FIG. 7 is a flowchart illustrating a destination setting operation performed by the MFP 101. Each operation (step) illustrated in the flowchart in FIG. 7 is realized when the CPU 211 of the MFP 101 executes the control program stored in the HDD 214.

In step S701, the CPU 211 determines whether the operation key 511 is operated. When the operation key 511 is operated (YES in step S701), the processing proceeds to step S702, and when the operation key 511 is not operated (NO in step S701), the processing proceeds to step S705. In step S702, a destination book screen including the contents of the destination book stored in the HDD 214 is displayed. The destination book screen displays the destinations corresponding to a fax, an E-mail, SMB, FTP, and WebDAV.

In step S703, the CPU 211 determines whether determination is instructed in a state in which at least one of the destinations registered to the destination book selected. When the determination is instructed (YES in step S703), the processing proceeds to step S704, and when the determination is not instructed (NO in step S703), the processing waits until the determination is instructed. In step S704, the selected destination is set as the destination of the image data.

In step S705, the CPU 211 determines whether the operation key 512 is operated. When the operation key 512 is operated (YES in step S705), the processing proceeds to step S706, and when the operation key 512 is not operated (NO in step S705), the processing proceeds to step S709. In step S706, the screen for receiving the input of the new destination from the user is displayed to receive the input of the new destination from the user. As the new destination, the destinations corresponding to the fax, the E-mail, the SMB, the FTP, and the WebDAV can be input.

In step S707, the CPU 211 determines whether the determination is instructed in a state in which the new destination is input. When the determination is instructed (YES in step S707), the processing proceeds to step S708, and when the determination is not instructed (NO in step S707), the processing waits until the determination is instructed. In step S708, the input destination is set as the destination of the image data.

In step S709, the CPU 211 determines whether the operation key 513 is operated. When the operation key 513 is operated (YES in step S709), the processing proceeds to step S710, and when the operation key 513 is not operated (NO in step S709), the processing returns to step S701. In step S710, the destination (folder information) that is previously registered via the screen illustrated in FIG. 6 is obtained, and then the obtained destination is set as the destination of the image data. Here, the folder information is specified based on the user information input via the screen illustrated in FIG. 4. However, the folder information about the user currently operating the MFP 101 may be specified using another method.

In step S711, the CPU 211 determines whether transmission is instructed (a start key (not illustrated) is pressed or not). When the transmission is instructed (YES in step S711), the processing proceeds to step S712. In step S712, the scanner 221 reads the document (generates the image data). When the transmission is not instructed (NO in step S711), the processing returns to step S701, and a second and subsequent destinations (broadcast transmission destinations) are set. In step S713, the image data generated in step S712 is transmitted to the destination set in step S704, S708, or S710.

Figure 8:
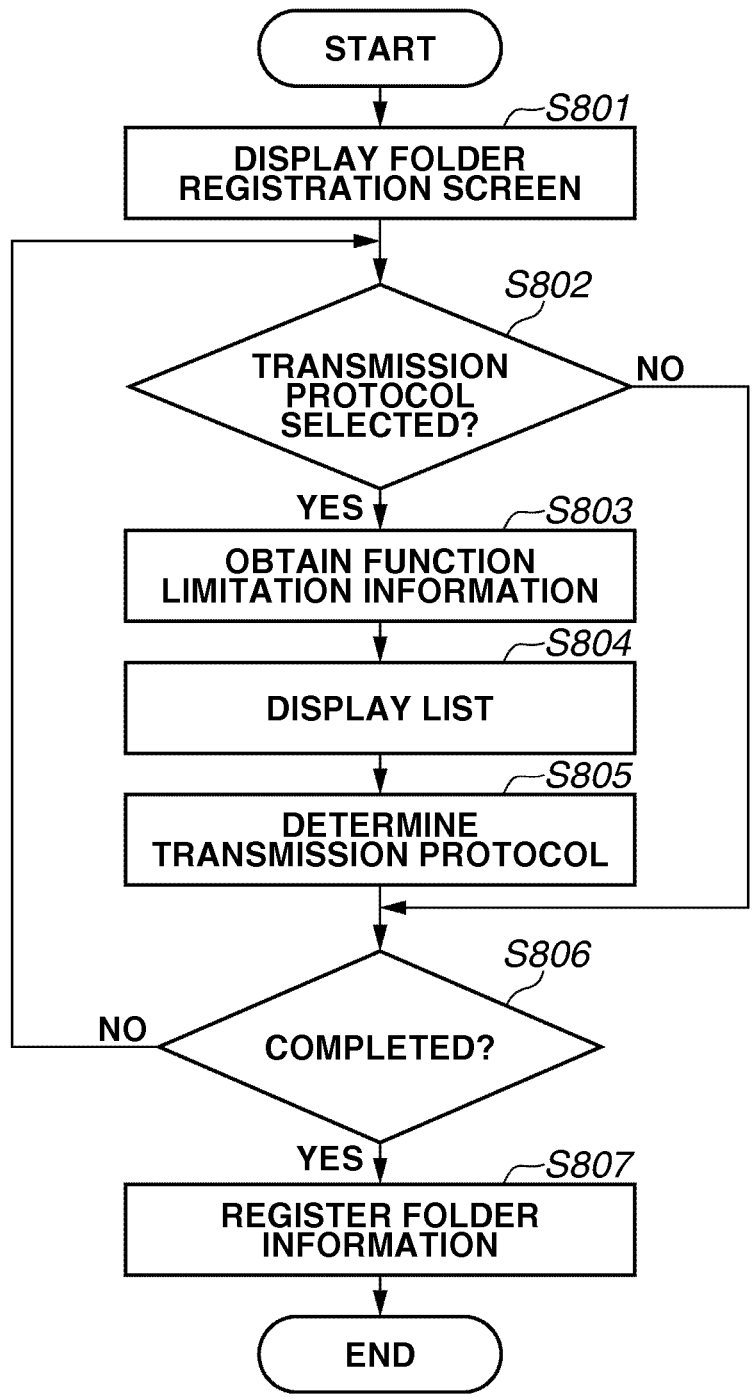
FIG. 8 is a flowchart illustrating a folder registration operation performed by the MFP according to the exemplary embodiment.

FIG. 8 is a flowchart illustrating a folder registration operation performed by the MFP 101. Operations illustrated in flowchart in FIG. 8 is started when the registration of the folder information is instructed by an operation on an operation key (not illustrated). Each of the operations (step) illustrated in the flowchart in FIG. 8 is realized when the CPU 211 of the MFP 101 executes the control program stored in the HDD 214.

In step S801, the screen illustrated in FIG. 6 is displayed. In step S802, the CPU 211 determines whether the selection of the transmission protocol is started by the operation in the region 601. When the selection of the transmission protocol is started (YES in step S801), the processing proceeds to step S803. When the selection of the transmission protocol is not started (NO in step S801), the input of the information other than the transmission protocol is received, and then the processing proceeds to step S806.

In step S803, function limitation information about the user currently operating the MFP 101 is obtained. The function limitation information is previously set in association with each user to the MFP 101 by an administrator, and is managed by a management table stored in the HDD 214.

FIG. 9 illustrates an example of an operation screen displayed on the operation unit 219. The administrator can set the function limitation for each user via the screen illustrated in FIG. 9. According to the example illustrated in FIG. 9, the user of "user_a" is permitted to transmit a facsimile, an SMB file, and a WebDAV file, and prohibited from transmitting an E-mail and an FTP file. The function limitation may not be set independently for each user, but may be set in common with all users. Only items related to the transmission of the image data (transmission protocol) are described herein, however, other items, such as use of color printing, may be also set together.

In step S804, the options of the transmission protocols are displayed as a list in a drop-down format as illustrated in FIG. 10. According to the example illustrated in FIG. 10, the SMB and the WebDAV are displayed as selectable, whereas the FTP is displayed in gray-out, and thus is non-selectable. This is because the function limitation information (as illustrated in FIG. 9) obtained in step S803 indicates that the use of the SMB and the WebDAV is permitted and the use of the FTP is prohibited. If the user changes the contents to be disabled, the content displayed in gray-out (displayed in a non-selectable state) is also changed.

As described above, since the user is prevented from selecting the transmission protocol set to be disabled, so that the user can be prevented from erroneously registering the folder information corresponding to the transmission protocol set to be disabled (folder information that cannot be used).

In step S805, the transmission protocol selected by the user from the list displayed in step S804 is determined, and then the processing proceeds to step S806. In step S806, the CPU 211 determines whether the operation of the folder registration is completed (whether the user instructs completion of the operation). When the operation is completed (YES in step S806), the processing proceeds to step S807, and when the operation is not completed (NO in step S806), the processing returns to step S802. In step S807, the input folder information is registered.

A second exemplary embodiment will now be described. According to the first exemplary embodiment, an example is described in which, when an destination (folder information) set according to an operation of the operation key 513 ("transmit file to yourself" key) is registered, control is performed so as not to register the destination corresponding to the transmission protocol set to be disabled. According to the second exemplary embodiment, it is described that, in addition to the operation described according to the first exemplary embodiment, when a destination is registered to a destination book, control is performed so as not to register the destination corresponding to the transmission protocol set to be disabled. The same reference numerals are given to the same configurations as those in the first exemplary embodiment, and the detailed description thereof will not be repeated.

FIGS. 11A and 11B illustrate examples of operation screens displayed on the operation unit 219. When the operation key 511 illustrated in FIG. 5 is operated, the screen illustrated in FIG. 11A is displayed. The MFP 101 is provided with two types of destination books i.e., a shared destination book and a personal destination book.

The personal destination book is managed in association with each user. Each user can perform reference, registration of destinations, and edition of destinations for the own destination book. However, the user cannot perform any of the reference, registration of destinations, and edition of destinations with respect to the destination book owned by others. On the other hand, the shared destination book can be used in common with a plurality of users (all users), and thus any user who can use the MFP 101 can perform the reference, registration of destinations, and edition of destinations.

FIG. 11A illustrates a shared destination book screen. Information 1101 indicates a type of the destination. Information 1102 indicates a name of the destination. Information 1103 indicates content of the destination. When the type is the fax, the information 1103 indicates a telephone number (fax number). When the type is the E-mail, the information 1103 indicates an E-mail destination. When the type is the SMB, the FTP, or the WebDAV, the information 1103 indicates a host name of a file server.

An operation key 1104 is used to switch from the shared destination book screen to the personal destination book screen. When the operation key 1104 is operated, the personal destination book screen illustrated in FIG. 11B is displayed. The contents displayed on the screen illustrated in FIG. 11B varies according to each user who operates the MFP 101. An operation key 1105 is used to register a new destination to the shared destination book. An operation key 1106 is used to display details of the destination registered to the shared destination book. An operation key 1107 is used to determine the destination selected by the user via the screen as the destination of the image data.

Information pieces 1111 to 1113 illustrated in FIG. 11B are the same as the information pieces 1101 to 1103 described with reference to FIG. 11A. The screen illustrated in FIG. 11B displays an operation key 1114 in place of the operation key 1104 on the screen illustrated in FIG. 11A. The operation key 1114 is used to switch from the personal destination book screen to the shared destination book screen. When the operation key 1114 is operated, the shared destination book screen illustrated in FIG. 11A is displayed.

An operation key 1115 is used to register a new destination to the personal destination book. An operation key 1116 is used to display details of the destination registered to the personal destination book. An operation key 1117 is used to determine the destination selected by the user via the screen as the destination of the image data.

Figure 12:
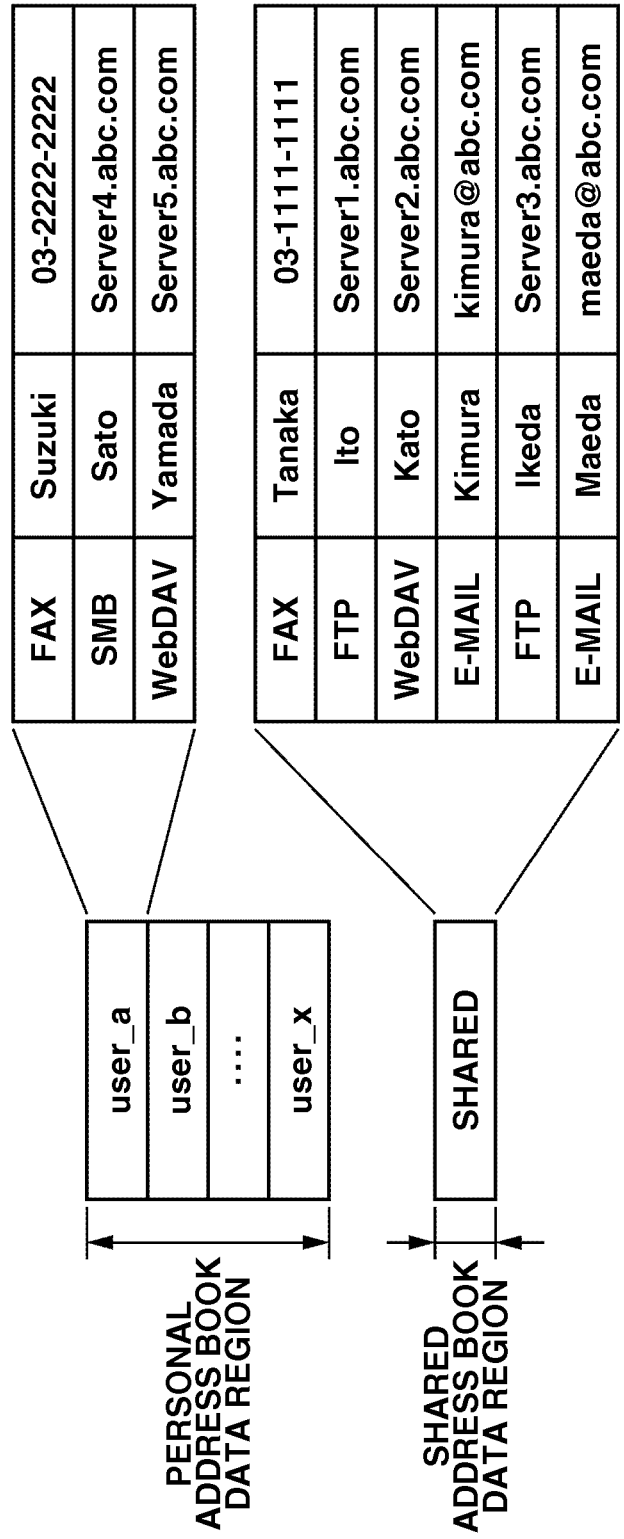
FIG. 12 illustrates a structure of data of a destination book according to the exemplary embodiment.

FIG. 12 schematically illustrates a configuration of destination book data stored in the HDD 214. As illustrated in FIG. 12, the destination book data includes a personal destination book data region and a shared destination book data region. The personal destination book data region includes the destination book data for each user. FIG. 12 illustrates only the personal destination book data of "user_a", in the personal destination book data for each user. However, the personal destination book data pieces are actually stored in association with respective users from "user_a" to "user_x".

Figure 13:
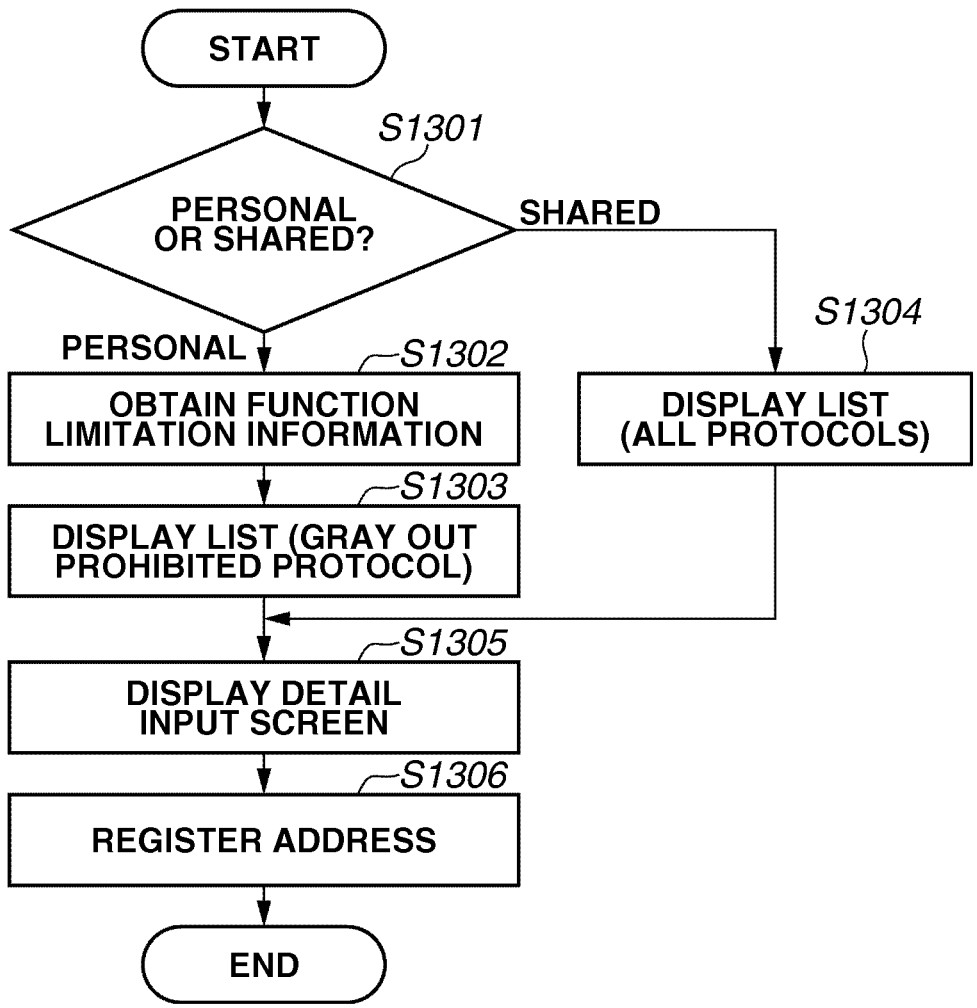
FIG. 13 is a flowchart illustrating a destination-book registration operation performed by the MFP according to the exemplary embodiment.

FIG. 13 is a flowchart illustrating a destination book registration operation performed by the MFP 101. The flowchart illustrated in FIG. 13 is started when the operation key 1105 or 1115 is operated. Each operation (step) illustrated in the flowchart in FIG. 13 is realized when the CPU 211 of the MFP 101 executes the control program stored in the HDD 214.

In step S1301, the CPU 211 determines whether the registration destination of the destination is the personal destination book or the shared destination book. In the case that the processing illustrated in the flowchart is started by the operation of the operation key 1105, the CPU 211 determines that the registration destination is the shared destination book (SHARED in step S1301), and then the processing proceeds to step S1304. On the other hand, in the case that the processing in the flowchart is started by the operation of the operation key 1115, the CPU 211 determines that the registration destination is the personal destination book (PERSONAL in step S1301), and then the processing proceeds to step S1302.

Figure 14A:
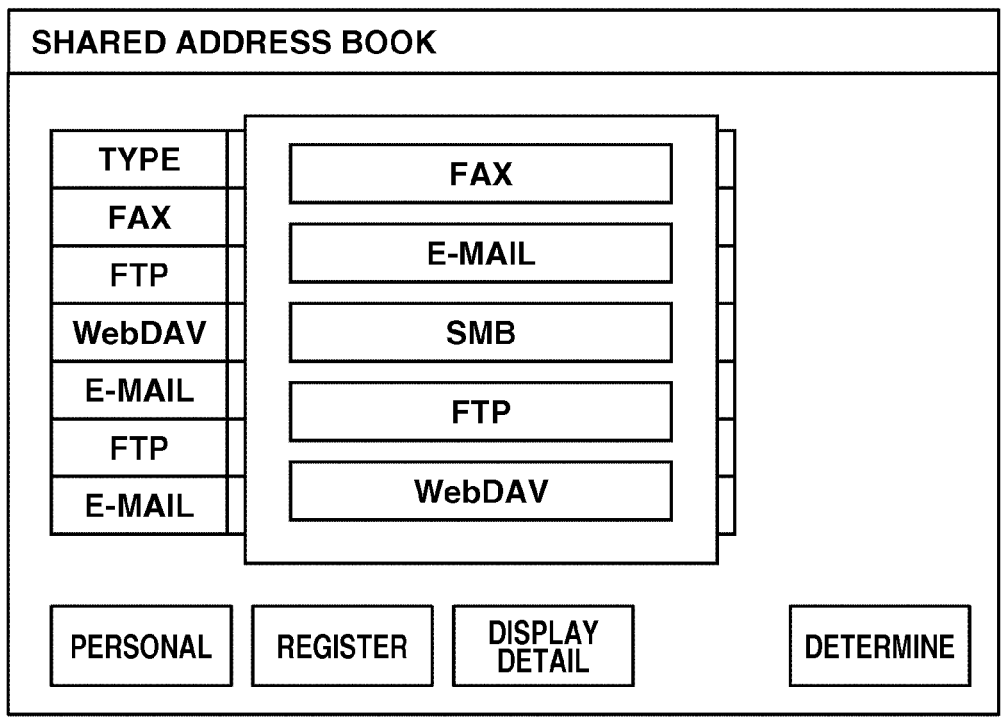
FIGS. 14A and 14B illustrate operation screens of the MFP according to the exemplary embodiment.
Figure 14B:
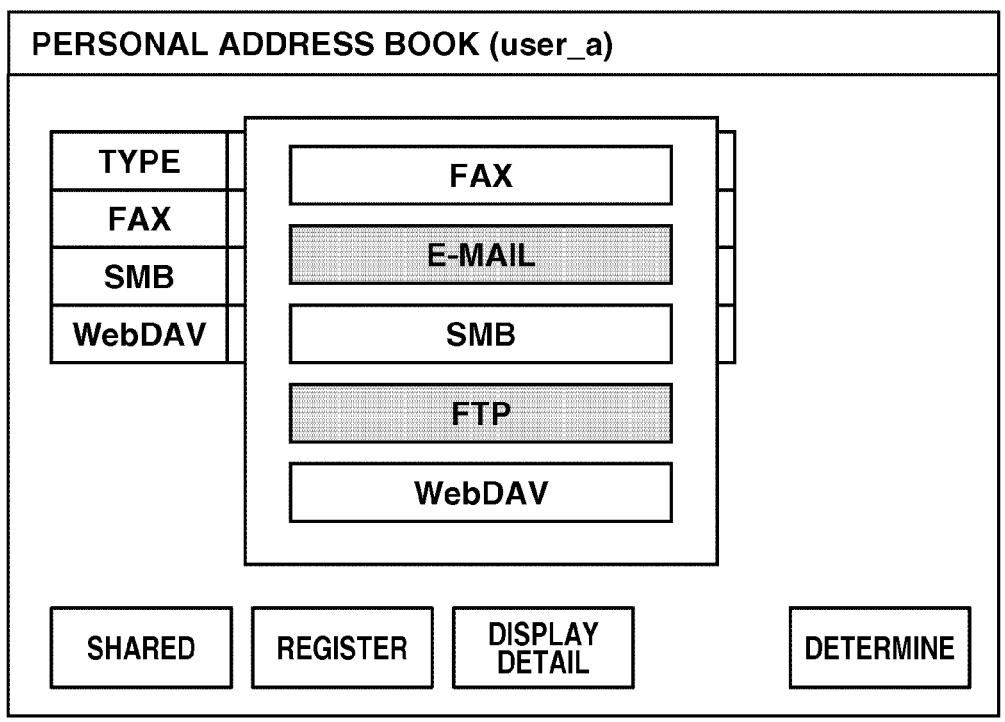

In step S1302, the CPU 211 obtains the function limitation information (illustrated in FIG. 9) about the user currently operating the MFP 101. In steps S1303 and S1304, a list of a plurality of transmission protocols is displayed (as illustrated in FIG. 14A or FIG. 14B) for allowing the user to select the type (transmission protocol) of the destination to be registered. At this point, in step S1304, all the transmission protocols provided to the MFP 101 are displayed to be selectable in the list as illustrated in FIG. 14A.

On the other hand, in step S1303, only the transmission protocols not set to be disabled are displayed to be selectable in the list among the transmission protocols provided to the MFP 101 as illustrated in FIG. 14B. In the example illustrated in FIG. 14B, since the use of the E-mail and the FTP are prohibited, those items are displayed in gray-out in a non-selectable state.

As described above, since the user cannot select the transmission protocol set to be disabled, the user can be prevented from erroneously registering the destination corresponding to the transmission protocol set to be disabled. In a case that the destination is registered to the shared destination book, the registration of the destination corresponding to the transmission protocol set to be disabled is permitted. This is because the plurality of users can refer to the shared destination book, and it is conceivable that a user registers the destination for another user.

In step S1305, a detail input screen (screen for inputting a name and contents of the destination) according to the type (transmission protocol) selected in step S1303 or step S1304 is displayed. In step S1306, based on the contents input by the user, the destination is registered to the destination book.

A third exemplary embodiment will now be described. According to the second exemplary embodiment, an example where the user operates the operation unit 219 to register the destination to the destination book is described. According to the third exemplary embodiment, a case where import data transmitted from the external device (PC 104) on the network is received and registered to the destination book as the destination will be described. The same reference numerals are given to the same configurations as those in the second exemplary embodiment, and the detailed description thereof will not be repeated.

FIG. 15 is a flowchart illustrating a destination book registration operation performed by the MFP 101 and the PC 104. Each operation (step) illustrated on a left side of the flowchart in FIG. 15 is realized when the CPU 211 of the MFP 101 executes the control program stored in the HDD 214. On the other hand, each operation (step) illustrated on a right side of the flowchart in FIG. 15 is realized when the CPU 311 of the PC 104 executes the control program stored in the HDD 314.

In step S1501, according to an instruction input from the user, the PC 104 requests the MFP 101 to start the import. In step S1502, the MFP 101 that has received the request from the PC 104 authenticates the user based on the user information (user ID and password) included in the request. More specifically, the MFP 101 transmits the received user information to the authentication server 102, and then receives a response of an authentication result therefrom.

When the user is successfully authenticated, in step S1503, the MFP 101 responds to the PC 104 with a permission for starting the import. In step S1504, the PC 104 that has received the response generates the import data. The import data includes destination data (including type, name, and destination contents) input from the user and information indicating the destination book of the registration destination (shared or personal). In step S1505, the PC 104 transmits the import data generated in step S1504 to the MFP 101.

In step S1506, the MFP 101 determines whether the destination book of the registration destination of the destination is the personal destination book or the shared destination book. When it is determined that the destination book of the registration destination is the personal destination book (PERSONAL in step S1506), the processing proceeds to step S1507. When it is not determined that the destination book of the registration destination is the personal destination book (SHARED in step S1505), the processing proceeds to step S1509.

In step S1507, the MFP 101 obtains the function limitation information (illustrated in FIG. 9) about the user specified by the authentication in step S1502. In step S1508, the MFP 101 deletes the destination corresponding to the transmission protocol set to be disabled from the import data received from the PC 104. When it is determined that the destination book of the registration destination is the shared destination book in step S1506, the processing in steps S1507 and S1508 is not performed.

In step S1509, the MFP 101 registers the destination included in the import data to the destination book. In step S1510, the MFP 101 notifies the PC 104 of the registration completion of the destination.

A fourth exemplary embodiment will now be described. According to the third exemplary embodiment, the example is described where the destination corresponding to the transmission protocol set to be disabled is deleted at the MFP 101 side. According to the fourth exemplary embodiment, a case will be described where the destination corresponding to the transmission protocol set to be disabled is deleted at the PC 104 side. The same reference numerals are given to the same configurations as those in the third exemplary embodiment, and the detailed description thereof will not be repeated.

FIG. 16 is a flowchart illustrating a destination book registration operation performed by the MFP 101 and the PC 104. Each operation (step) illustrated on a left side of the flowchart in FIG. 16 is realized when the CPU 211 of the MFP 101 executes the control program stored in the HDD 214. On the other hand, each operation (step) illustrated on a right side of the flowchart in FIG. 16 is realized when the CPU 311 of the PC 104 executes the control program stored in the HDD 314.

In step S1601, according to an instruction input from the user, the PC 104 requests the MFP 101 to start the import. In step S1602, the MFP 101 that has received the request from the PC 104 authenticates the user based on the user information (user ID and password) included in the request. More specifically, the MFP 101 transmits the received user information to the authentication server 102, and then receives a response of an authentication result therefrom.

When the user is successfully authenticated, then in step S1603, the MFP 101 obtains the function limitation information (illustrated in FIG. 9) about the user specified by the authentication in step S1602. In step S1604, the MFP 101 responds to the PC 104 with the function limitation information obtained in step S1603 together with a permission for starting the import.

In step S1605, the PC 104 that has received the response generates the import data. The import data includes destination data (including type, name, and destination contents) input from the user and information indicating the destination book of the registration destination (shared or personal). In step S1606, the PC 104 determines whether the destination book of the registration destination of the destination is the personal destination book or the shared destination book. When it is determined that the destination book of the registration destination is the personal destination book (PERSONAL in step S1606), the processing proceeds to step S1607. When it is not determined that the destination book of the registration destination is the personal destination book (SHARED in step S1606), the processing proceeds to step S1608.

In step S1607, the PC 104 deletes the destination corresponding to the transmission protocol set to be disabled from the import data generated in step S1605. When it is determined that the destination book of the registration destination is the shared destination book in step S1606, the processing in step S1607 is not performed. In this flowchart, the determination in step S1606 and the deletion in step S1607 are performed after the import data is generated in step S1605, however, the determination may be performed before the import data is generated. In this case, in the case that it is determined that the destination book of the registration destination is the personal destination book, it can be configured that the destination corresponding to the transmission protocol set to be disabled is not input to the PC 104 (originally not included in the port data).

In step S1608, the PC 104 transmits the import data to the MFP 101. In step S1609, the MFP 101 registers the destination included in the import data received from the PC 104 to the destination book. In step S1610, the MFP 101 notifies the PC 104 of the registration completion of the destination.

As described above, according to the configurations described in the first to fourth exemplary embodiments, it can be configured that the destination corresponding to the transmission protocol set to be disabled is not registered. The configurations described in the first to fourth exemplary embodiments may be independently realized or a plurality of exemplary embodiments may be combined with one another to be realized. Further, particularly, according to the first and second exemplary embodiments, the transmission protocol set to be disabled is set to be non-selectable, so that the destination corresponding to the transmission protocol set to be disabled is prevented from being registered. However, another embodiment may be adopted. For example, the destination corresponding to the transmission protocol set to be disabled can be prevented from being registered by a method in which the transmission protocol set to be disabled is permitted to be selected and an error screen is displayed when the user finally gives an instruction for the registration (when the operation for the registration is completed).

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The computer-readable storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that these disclosed exemplary embodiments are not limiting. The scope of the following claims is to be accorded the broadest interpretation so as to encompass all modifications, equivalent structures, and functions.

What is claimed is:

1. A data processing apparatus being able to transmit data in accordance with a plurality of transmission protocols, the data processing apparatus comprising:
    a controller configured to register folder information in association with user information; and
    a user interface configured to receive user information,
    wherein the controller sets, as a transmission destination of data in accordance with selection of an operation key of the data processing apparatus, the folder information which has been registered in association with the user information received by the user interface,
    wherein the data processing apparatus transmits data to a folder indicated by the folder information set in accordance with the selection of the operation key, and
    wherein the controller registers, in accordance with the user information, folder information corresponding to a transmission protocol which is available to a user specified based on the user information from among the plurality of the transmission protocols.

2. The data processing apparatus according to claim 1, further comprising a storage configured to manage whether each of the plurality of transmission protocols is available or unavailable for use in association with each user.

3. The data processing apparatus according to claim 1, wherein the plurality of transmission protocols includes at least one of a server message block (SMB), a file transfer protocol (FTP), or a Web-based distributed authoring and versioning protocol (WebDAV).

4. The data processing apparatus according to claim 1, further comprising a display configured to display the operation key.

5. The data processing apparatus according to claim 1, further comprising a display controller configured to cause a display to display a list of the plurality of transmission protocols in a state in which the transmission protocol which is available to the user specified based on the user information is selectable and a transmission protocol which is not available to the user specified based on the user information is non-selectable.

6. The data processing apparatus according to claim 1, wherein the folder information includes a host name and folder path.

7. A data processing apparatus being able to transmit data in accordance with a plurality of transmission protocols, the data processing apparatus comprising:
- a controller configured to register folder information in association with user information; and
- a user interface configured to receive user information;
- wherein the controller sets, as a transmission destination of data in accordance with selection of an operation key of the data processing apparatus, the folder information which has been registered in association with the user information received by the user interface,
- wherein the data processing apparatus transmits data to a folder indicated by the folder information set in accordance with the selection of the operation key,
- wherein the user interface receives a selection of a transmission protocol,
- wherein the user interface receives an input of folder information,
- wherein the controller registers the folder information received by the user interface and the transmission protocol selection received by the user interface in association with the user information, and
- wherein the transmission protocol being able to be selected by the user interface is limited to be a transmission protocol which is available to a user specified based on the user information.

8. The data processing apparatus according to claim 7, further comprising a storage configured to manage available or unavailable for use of each of the plurality of transmission protocols in association with each user.

9. The data processing apparatus according to claim 7, wherein the plurality of transmission protocols includes at least one of a server message block (SMB), a file transfer protocol (FTP), or a Web-based distributed authoring and versioning protocol (WebDAV).

10. The data processing apparatus according to claim 7, further comprising a display unit configured to display the operation key.

11. The data processing apparatus according to claim 7, further comprising a display controller configured to cause a display to display a list of the plurality of transmission protocols in a state in which the transmission protocol which is available to the user specified based on the user information is selectable and a transmission protocol which is not available to the user specified based on the user information is non-selectable.

12. The data processing apparatus according to claim 7, wherein the folder information includes a host name and folder path.

13. A control method for controlling a data processing apparatus being able to transmit data in accordance with a plurality of transmission protocols, the control method comprising:
- registering folder information in association with user information;
- receiving user information;
- setting, as a transmission destination of data in accordance with selection of an operation key of the data processing apparatus, the folder information which has been registered in association with the received user information; and
- transmitting data to a folder indicated by the folder information set in accordance with the selection of the operation key,
- wherein registering includes registering, in accordance with the user information, folder information corresponding to a transmission protocol which is available to a user specified based on the user information from among the plurality of the transmission protocols.

14. A control method for controlling a data processing apparatus being able to transmit data in accordance with a plurality of transmission protocols, the control method comprising:
- registering folder information in association with user information;
- receiving user information;
- setting, as a transmission destination of data in accordance with selection of an operation key of the data processing apparatus, the folder information which has been registered in association with the received user information;
- transmitting data to a folder indicated by the folder information set in accordance with selection of the operation key,
- wherein receiving includes receiving a selection of a transmission protocol,
- wherein receiving includes receiving an input of folder information,
- wherein registering includes registering the received folder information and the received transmission protocol selection received in association with the user information, and
- wherein the transmission protocol being able to be selected is limited to be a transmission protocol which is available to a user specified based on the user information.

15. A non-transitory computer readable storage medium for storing a computer program for controlling a data processing apparatus being able to transmit data in accordance with a plurality of transmission protocols, the computer program comprising:
- a code to register folder information in association with user information;
- a code to receive user information;
- a code to set, as a transmission destination of data in accordance with selection of an operation key of the data processing apparatus, the folder information which has been registered in association with the received user information; and
- a code to transmit data to a folder indicated by the folder information set in accordance with the selection of the operation key,
- wherein the code to register includes a code to register, in accordance with the user information, folder information corresponding to a transmission protocol which is available to a user specified based on the user information from among the plurality of the transmission protocols.

16. A non-transitory computer readable storage medium for storing a computer program for controlling a data processing apparatus being able to transmit data in accordance with a plurality of transmission protocols, the computer program comprising:
- a code to register folder information in association with user information;
- a code to receive user information;
- a code to set, as a transmission destination of data in accordance with selection of an operation key of the data processing apparatus, the folder information which has been registered in association with the received user information;
- a code to transmit data to a folder indicated by the folder information set in accordance with the selection of the operation key, wherein the code to receive includes a code to receive a selection of a transmission protocol, wherein the code to receive includes a code to receive an input of folder information, wherein the code to register includes a code to register the received folder information and the received transmission protocol selection received in association with the user information, and wherein the transmission protocol being able to be selected is limited to be a transmission protocol which is available to a user specified based on the user information.

* * * * *